ns Patent Office 2,993,410
Patented July 25, 1961

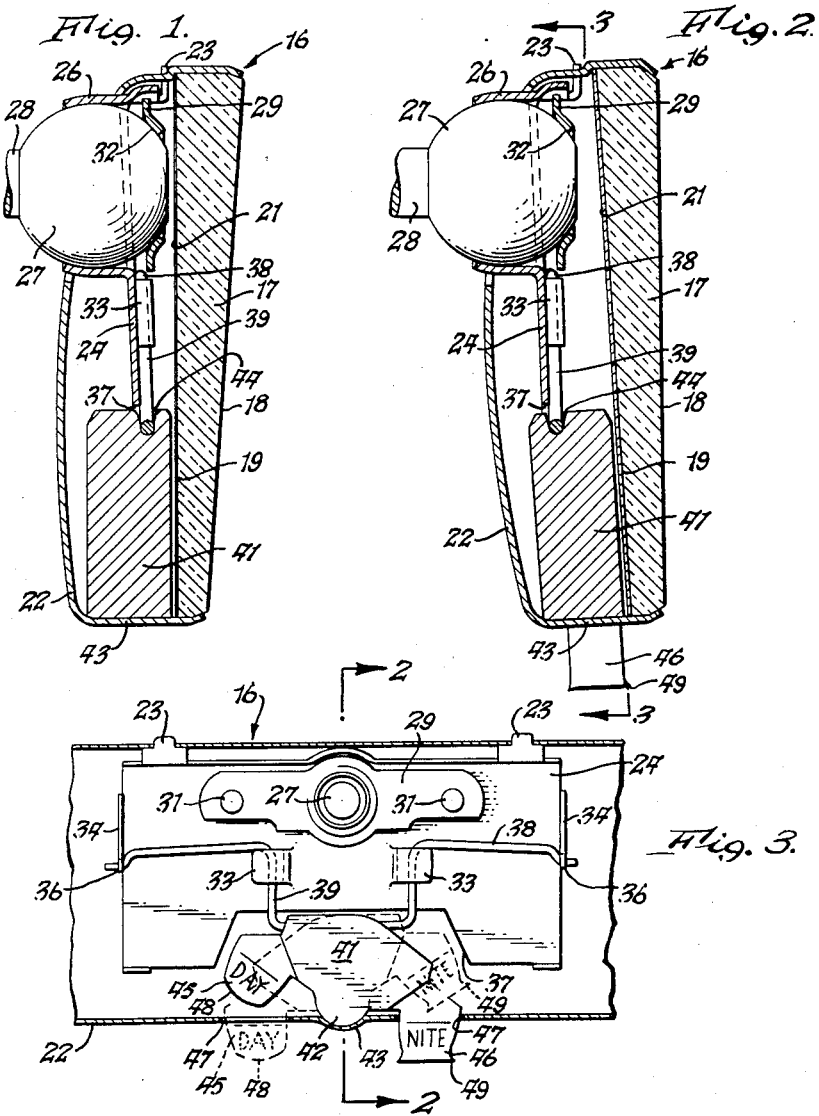
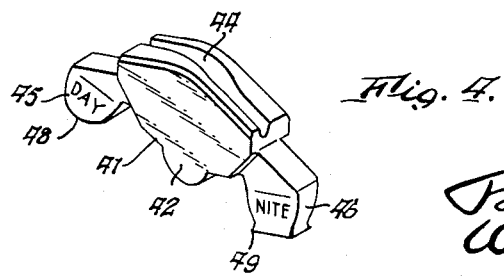

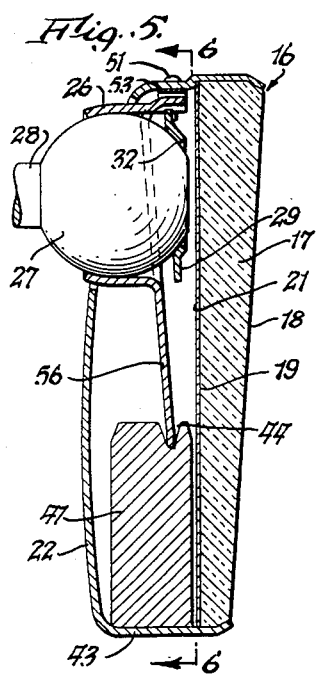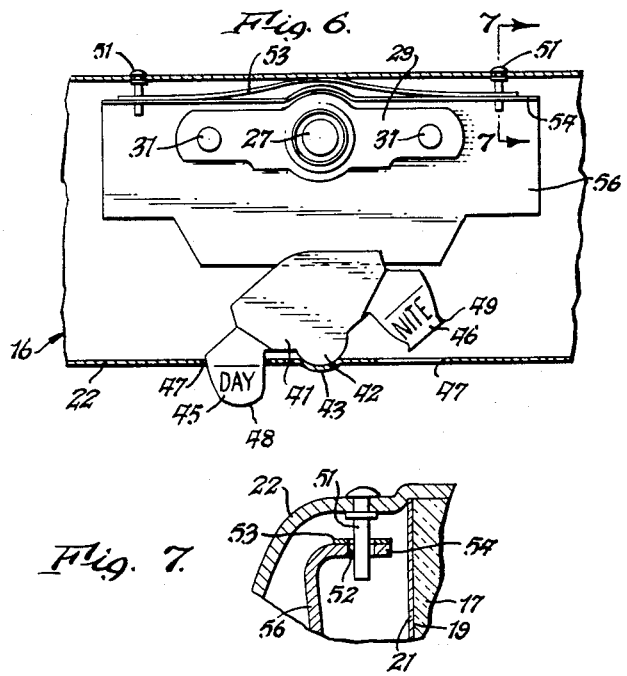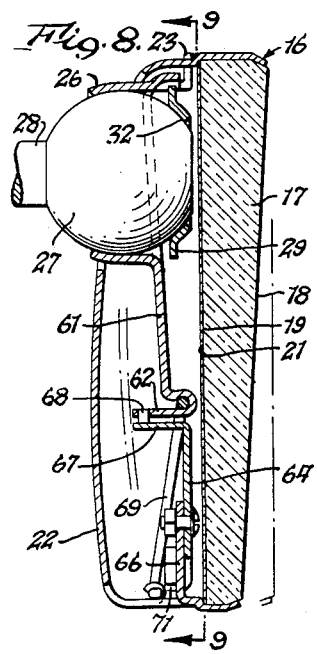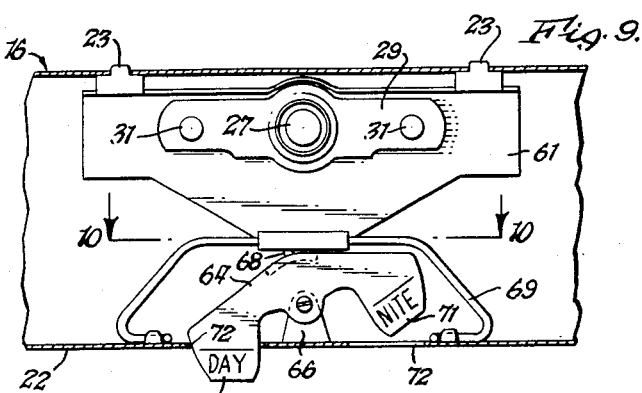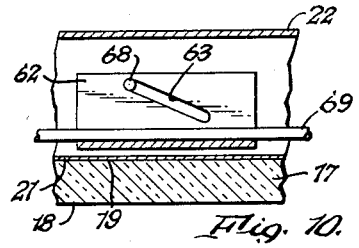

2,993,410
REAR VISION MIRROR
Paul Bertell and William R. Knowlton, Williamsville,
N.Y., assignors to Standard Mirror Company, Inc.,
Buffalo, N.Y., a corporation of New York
Filed Dec. 4, 1957, Ser. No. 700,717
3 Claims. (Cl. 88—98)

This invention relates to a glare reducing rear vision mirror and more particularly to a rear vision mirror adapted for both night and day driving wherein the brightness of images or light from headlights or the sun can be reduced in intensity from the normal maximum.

The invention is particularly shown as embodied in a rear vision mirror having a single prismoidal mirror as shown in the LaHodny and Bertell Patent No. 2,325,615 granted August 3, 1943 for Mounting for Rear Vision Mirrors where the high intensity image is reflected from the metallic reflective coating on the back of a prismoidal glass panel and the low intensity image is reflected from the front face of the prismoidal glass panel. It is also possible to obtain, with two transparent panels arranged at an angle to each other and one provided with a primary reflective coating, a series of images of reduced intensity by selecting, as disclosed in Shertz No. 2,455,818 granted December 7, 1948, images which have been subjected to different numbers of cross reflections between the primary reflective surface and the companion transparent plate. In both cases, the different images are selected by adjusting the vertical angularity of the prismoidal mirror or array of the transparent panels about a horizontal axis generally parallel with both of the reflective surfaces to obtain images of the desired intensity.

An important object of the invention is to provide such a rear vision mirror which is unusually light in weight and at the same time is of sturdy and rugged construction.

Another important object is to provide such a rear vision mirror which is free from objectionable vibration, particularly as resulting from unevenness in the road as when passing over the expansion joints in a concrete road.

Another important object of the invention is to provide a quickly and easily operated manual adjustment for adjusting the rear vision mirror to and from its positions of high and low reflectivity, it being merely necessary to push in a button or fingerpiece to effect each adjustment.

Another important object is to provide such a simple manual adjustment for the reflectivity of the mirror which does not disturb the aim of the mirror.

Another important object of the invention is to provide such an adjustment in which the entire mirror is grasped in pushing in the push button so that no delicate manipulation of a fingerpiece is required as is common with present day mirrors.

Another object is to provide such an adjustment which involves two fingerpieces, one of which projects the other into operative position when it is pushed out of sight, this providing an automatic indication as to whether the mirror is in its position of high or low intensity adjustment and also permitting one fingerpiece to be labeled, say, "Day" and the other "Nite."

Another object is to provide such a rear vision mirror which allows a tactile check to determine whether the mirror is in one or the other position of adjustment as to the degree of reflectivity, it being possible to contrast the feel of one push button with the other as by making one angular and the other round; one rough and the other smooth, etc.

Another object is to provide such a rear vision mirror which can be conventionally aimed and leveled with little likelihood of disturbing the adjustment of the mirror as to reflectivity, each push button occupying only a small part of the rim of the mirror.

Other objects and advantages of the invention will be apparent from the following description and drawings in which:

FIG. 1 is a sectional view of a rear view mirror embodying the principles of the invention and showing the mirror element thereof in one position of adjustment as to reflectivity;

FIG. 2 is a vertical sectional view thereof the rear view mirror taken generally on line 2—2 in FIG. 3;

FIG. 3 is a vertical sectional view, in reduced scale, through the rear vision mirror taken generally on line 3—3 in FIG. 2;

FIG. 4 is a perspective view of an adjustment piece used in the mirror of FIG. 1;

FIG. 5 is a section view of a modified embodiment of the rear view mirror of the invention;

FIG. 6 is a view, in reduced scale, as generally seen from line 6—6 in FIG. 5;

FIG. 7 is an enlarged fragmentary section view as seen from line 7—7 in FIG. 6;

FIG. 8 is a section view of another modified embodiment of the rear view mirror of the invention;

FIG. 9 is a view, in reduced scale, as generally seen from line 9—9 in FIG. 8;

FIG. 10 is an enlarged fragmentary section view as seen from line 10—10 in FIG. 9; and FIG. 11 is a perspective view of an adjustment piece used in the mirror of FIG. 8.

The invention is shown as embodied in a rear vision mirror assembly 16 which includes a prismoidal mirror panel indicated generally at 17, although it will be understood that the mounting can also be used to support a normal mirror panel in which case the adjustable support as hereinafter described would merely be used to move the mirror panel from an operative to an inoperative position and vice versa. The prismoidal mirror panel is shown as made of a horizontally elongated plate of glass which is ground so that the vertical axis of its front planar face 18 is at an angle to the vertical axis of its rear planar face 19 but the horizontal axes of these faces are parallel. The mirror panel 17 is thereby wedge-shaped in vertical section and is shown as arranged with its thicker part at its upper end. The glass plate 17 is provided on its rear face with a coating 21 of reflective material, this coating being preferably of a highly reflective metal such as silver in view of the fact that a dulled effect is obtained through the use of a secondary image reflected by the front face 18 of the glass panel 17. The silver coating 21 can be protected by the usual paint and cardboard backing (not shown).

The glass plate 17 is supported about its periphery in the rim of a metallic housing or casing 22 which is pivotally supported at its upper end by pin or tab members 23 formed integral at the top edge of an inner metal plate member 24. The plate member 24 has a spherical cylindrical portion 26 projecting away from the glass plate 17 and which is adapted to snugly receive a ball 27 formed integral with a stem 28 which is adapted for affixing the mirror assembly in position within a motor vehicle in the usual manner. A metal clamping plate 29 is secured by fastening means, such as rivets 31, to the side of the plate member 24 facing the glass plate 17, and has a spherical opening 32 which snugly engages the surface of the ball 27 to movably affix the plate 24 upon the ball 27.

A pair of integral ears or lugs 33 are struck out of the central part of the inner metal plate member 24, these ears being in horizontal alinement and having their free ends projecting horizontally away from each other. A pair of integral ears 34 are formed at opposite vertical edges of the plate member 24, each ear having an upwardly directed slot 36 at the lower end thereof. A recess 37 is formed at the lower center portion of the inner plate 24, and a spring 38 is positionally supported on the front surface of the plate by the lugs 33. The spring 38 has a rectangularly arranged center portion 39, the lower edge of which projects into the opening formed by the recess 37, while the ends of the spring are positioned in the slots 36 of the ears 34.

A rock lever 41, having a rounded bottom pivot portion 42, is rockably seated within a recess 43 formed in the casing 22, the upper portion of the lever having an offset groove, or cam track 44 adapted to receive the spring 38 at the center portion 39 thereof. The design of the spring is such as to result in constant compression upon the rock lever 41 to maintain the rounded bottom pivot portion 42 snugly within the recess 43. The offset groove 44 is of non-uniform depth and passes from a minimum depth at the center to a greater depth toward each end thereof. Such arrangement will provide a fore-and-aft swinging movement of the housing 22 and mirror 17 as the lever 41 is rotated from one extreme angular position to another.

Arranged on each side of the lever 41, and projecting downwardly, are a pair of push buttons or fingerpieces 45, 46, each arranged to project through holes or slots 47, formed in the bottom rim of the casing 22. One of the tabs has the word "Day" on the face thereof, while the other tab has the word "Nite." The letters can, of course, be luminous. Also to provide a tactile difference between the two push buttons 45 and 46, one can be shaped differently, or roughened, or otherwise made to distinguish from each other to the touch so that they can be distinguished in the dark. Thus the push button 46 can be formed to provide barbs 49 whereas the push button 45 can be provided with a contrasting smooth, rounded surface 48. It will be seen that when the lever 41 is in one extreme angular position, the glass 17 will be held in a first position to provide reflection from one of the reflective faces 18 or 19, and such position will be indicated by the respective push button 45 or 46 projecting from the lower rim of the casing 22; conversely, when the lever 41 is in the opposite angular position, the glass 17 will be held in another position to provide reflection from the other one of the reflective faces 18 or 19 which will be so indicated by the other push button or tab. Thus the vehicle operator, after once aiming the mirror housing 22 to cover the desired rear view area, need only press one of the tabs 45 or 46 to obtain the desired intensity reflection.

The use of the rock lever push buttons or tabs 45, 46, affords a simple and effective means for adjustment of mirror position. It will be appreciated that in a mirror adjustment operation, the operator will normally place his thumb upon a projecting tab, and one or more of his fingers upon the upper rim of the housing 22, and by a simple squeezing action will force the tab upwardly within the housing, which simultaneously causes the other tab to be projected out of the housing. Such an operation is not only extremely simple to perform, but may be done without changing the aim of the mirror. Also such operation in adjusting the mirror to different positions of reflectivity is not a delicate operation as compared with flipping or swinging a small fingerpiece horizontally. In addition, by observing which of the two tabs 45, 46 is projecting, a simple visual check of mirror adjustment may be realized, which of course, is a great convenience while driving and which does not interfere with the safe operation of the vehicle. The tactile difference between the push buttons 45, 46 also permits of determining the positions of adjustment by feel. All of these are important in educating the public in the use of this type of rear vision mirror.

A modified embodiment of the invention is illustrated in FIGS. 5 to 7, which will be described using the same numbers as used in the identification of common parts in the first described embodiment.

Fixed to and projecting downwardly from the upper surface of the housing 22 are pin members 51 which project through holes 52 formed in a leaf spring 53, and in a flange portion 54 of an inner sheet metal plate member 56. The leaf spring is bowed at its mid-region for abutment with the inner surface of the housing 22 so that it will constantly urge the plate member 56 downwardly in the housing. The lower center portion of the plate member 56 enters into the groove 44 of the rocker lever 41.

It will be seen that in the modified embodiment, the rock lever 41 acts directly upon the inner plate member 56, instead of acting thereupon by way of a spring as in the first described embodiment. The adjustment and operation of the modified embodiment is otherwise similar to the first described embodiment.

A third modified embodiment of the invention is illustrated in FIGS. 8 to 11, which will be described using the same numbers as used in the identification of common parts in the first described embodiment.

This embodiment is similar to the first described embodiment and differs therefrom primarily in the details of the rock lever and the spring holding means. An inner sheet metal plate member 61, which has integral tabs 23 for the pivotal support of the housing 22, extends downwardly and has a centrally arranged rearwardly projecting flange 62 which has a slot 63 arranged at an angle to the main body of the plate member, as best seen in FIG. 10. A rock lever 64, which is pivotally mounted upon a projection 66 formed integral with the housing 22, has a rearwardly extending flange 67 in which is arranged a pin member 68. The pin member is slidingly arranged within the slot 63 of the plate member 61. A spring 69 is compressively arranged between the inner surface of the housing 22 and the plate member 61 at the fold line of the flange 62. Rock lever 64 has tabs 71 which alternately may project through holes, or slots 72 formed in the housing 22, one of said tabs being marked on the front surface with the word "Day" the other of said tabs being marked with the word "Nite."

It will be seen that angular rotation of the rock lever 64 will cause rocking movement of the housing about the pivot pin members 23 by reason of the sliding engagement of the pin member 68 in the angular slot 63. Such movement will pass through the dead center of the spring 69, whereby the spring will tend to hold the pin member 68 at either end position of the slot 63. The adjustment and operation of this modification is otherwise similar to those above described.

It will be seen that all forms of the invention include the reflective panel 17, the support 24, the means 23 pivotally supporting this reflective panel 17 on this support 24 to swing about a generally horizontal axis which is generally parallel with either reflective surface 18 or 21 of the panel, the fingerpiece 45 or 56 arranged adjacent one side of the rim of the panel, the means 41, 42, 43 movably supporting the fingerpiece for movement substantially directly toward and from the opposite side of the rim of the panel generally parallel with the reflective surfaces 18 or 21, and means, such as the groove 44 and spring 38, actuated in response to the movement of the fingerpiece 45, 46 for moving the reflective panel 17 relative to the support 24 about this horizontal axis.

It will be seen from the foregoing that application of the principles of the invention will result in an improved adjustment means for the intensity of a rear view mirror which satisfies the objectives set forth hereinbefore.

We claim:
1. A rear vision mirror assembly including a reflective panel having upper and lower peripheral rim portions, a support for said panel, means pivotally supporting said reflective panel on said support to swing about a generally horizontal axis arranged generally parallel with a reflective surface of said panel, a casing in rear of said panel, a rock lever arranged in said casing in rear of said panel adjacent one of said rim portions for rotation about an axis intermediate the opposite ends of said rock lever and generally perpendicular to said reflective surface, said opposite ends of said rock lever being alternately movable toward the other of said rim portions in a plane generally parallel with said reflective surface, a push button at each of said opposite ends and actuating said rock lever, said push buttons being alternately projectible to and from substantially completely behind said reflective panel through openings provided in the adjacent portion of said casing and means actuated by said rock lever and moving said reflective panel relative to said support about said axis from one angular position to another whereby the user upon placing his thumb against the projecting push button and his fingers against said other of said rim portions can, by squeezing his thumb and fingers together, push the projecting push button behind said panel thereby to project the other push button out from behind said panel, only one push button being available at any one time to move said panel from one position of adjustment to the other.

2. A rear vision mirror, including a reflective panel means having upper and lower peripheral rim portions, a supporting means, a pivotal connection supporting said panel means on said supporting means to swing about a generally horizontal axis arranged generally parallel with a reflective surface of said panel means, a rock lever pivotally mounted behind said panel means and adjacent one of said rim portions on one of said means to swing about a generally horizontal axis extending generally perpendicularly to said reflective surface, the opposite ends of said rock lever moving substantially directly toward and from the other of said rim portions, a push button at each of said opposite ends and actuating said rock lever and being alternately projectible from substantially completely behind said panel means past said one of said rim portions, said rock lever being formed to provide a cam groove on a surface thereof which opposes said other of said rim portions and said cam groove being arranged at an angle to said reflective surface of said panel means, and a spring having a part arranged in said groove and compressively interposed between said rock lever and the other of said means whereby angular movement of said rock lever will cause angular movement of said panel means about said axis whereby the user upon placing his thumb against the projecting push button and his fingers against said other of said rim portions can, by squeezing his thumb and fingers together, push the projecting push button behind said panel means thereby to project the other push button out from behind said panel means, only one push button being available at any one time to move said panel means from one position of adjustment to the other.

3. A rear vision mirror, including a reflective panel, a casing in rear of said panel and having a rim fixed to the rim of said panel, supporting means, a pivotal connection supporting said panel on said supporting means to swing about a generally horizontal axis arranged generally parallel with a reflective surface of said panel, a rock lever arranged between said casing and panel and having a downwardly facing pivot portion pivotally supported on a seat provided in the lower portion of said casing rim for movement about a generally horizontal axis extending generally perpendicular to said reflective surface, push buttons on opposite ends of said rock lever and projecting downwardly therefrom, said push buttons being alternately projectible from substantially completely behind said panel through openings provided in said lower portion of said casing rim, and means actuated by said rock lever and moving said reflective panel relative to said supporting means about said first mentioned axis whereby the user upon placing his thumb against the projecting push button and his fingers against said other of said rim portions can, by squeezing his thumb and fingers together, push the projecting push button behind said panel thereby to project the other push button out from behind said panel, only one push button being available at any one time to move said panel from one position of adjustment to the other.

References Cited in the file of this patent

UNITED STATES PATENTS

| | | |
|---|---|---|
| 2,052,770 | Hofer | Sept. 11, 1936 |
| 2,645,158 | Bertell et al. | July 14, 1953 |

FOREIGN PATENTS

| | | |
|---|---|---|
| 1,117,799 | France | Mar. 5, 1956 |
| 1,123,827 | France | June 18, 1956 |